July 20, 1965 R. E. TISCH 3,195,902
ROTARY SEAL WITH SERPENTINE CONFIGURATIONS
Filed Aug. 2, 1960
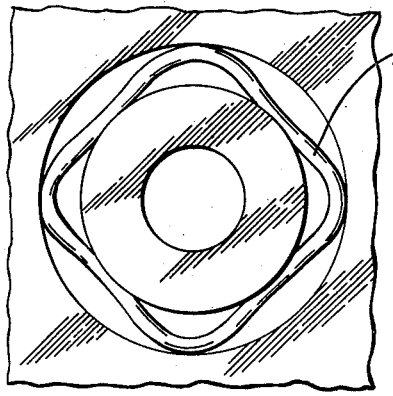
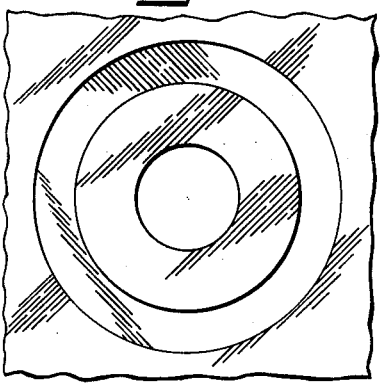
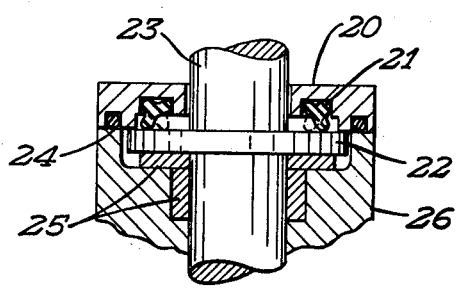
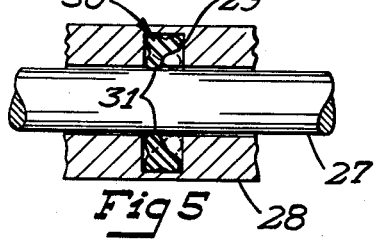
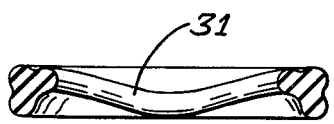
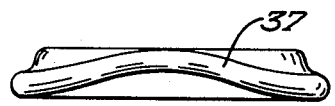
INVENTOR.
RICHARD E. TISCH
BY
Everett J. Schroeder
ATTORNEY United States Patent Office 3,195,902
Patented July 20, 1965

3,195,902
ROTARY SEAL WITH SERPENTINE
CONFIGURATIONS
Richard E. Tisch, Woodland Hills, Calif., assignor to Minnesota Rubber Company, Minneapolis, Minn., a corporation of Minnesota
Filed Aug. 2, 1960, Ser. No. 47,090
8 Claims. (Cl. 277—95)

This invention relates to seals and sealing rings for perfecting the same. More particularly it relates to rotary seals wherein one movable part rotates relative to the other and a sealing device is disposed between the two parts to prevent the escape of a fluid therebetween.

Standard types of rotary seals have a constantly circular annular ridge or face, against which the surface to be sealed rotates relatively. Since such a face rubs continuously on the same annular area, heating which results from the friction causes shortening of the life of the seal with consequent early leakage or complete failure as a seal. Once the relatively moving parts commence to heat because of friction between the seal an the movable part, the wear on the seal increases very rapidly because the seal itself is more susceptible to wear at higher temperatures and it tends to expand as the temperature rises, thereby increasing the pressure with which the seal bears against the moving face.

The theory of my new rotary seal is to provide a wiping action to any given area of the surface being sealed so that this particular area experiences alternate motion of the seal face back and forth across it radially in the case of a face seal and axially in the case of a shaft seal. This moves the sealing segment back and forth across a portion of the face which is wider than the seal face, thus permitting cooling of the face through convection or conduction of the heat from the surface of the face to the surrounding atmosphere or liquid. In the case of a mechanism wherein a fluid of lower temperature than that of the seal face is being contained, and where the fluid will have some lubricating value, the relative motion will not only cool the face but will reduce friction by wiping lubricant across the area to be sealed.

The problems outlined above and the theory of solution are the same irrespective of whether the face is a rotary face seal or a rotary shaft seal, the only difference being that in the rotary face seal the wiping action takes place radially, while with a rotary shaft seal the wiping action takes place axially. It will be readily appreciated, of course, that in the case of the face seal, the sealing ring to be utilized will have an axial dimension greater than the axial dimension of the groove within which the sealing ring is confined, while in the case of the rotary shaft seal the sealing ring will have a radial dimension greater than the radial dimension of the groove within which it is disposed. In this manner, the sealing surface of the rings are maintained under pressure so that the sealing ring itself will be somewhat compressed.

It is a general object of my invention to provide a novel and improved rotary seal of simple and inexpensive construction and improved operation.

A more specific object is to provide a rotary seal which is comprised of a sealing ring disposed within a groove in one of a pair of relatively rotating surfaces, the sealing ring being so constructed and arranged as to bear against an area wider than the sealing surface and alternately wipe such surfaces in such a manner as to permit cooling of the surface by convection or conduction.

Another object is to provide an improved rotary seal which, when used in conjunction with a fluid having lubricating properties, will function in such a manner as to wipe lubricant across the surface which is being sealed and thereby prolong the life of the seal by substantially reducing friction.

Another object is to provide a novel and improved rotary seal having a novel exterior configuration which when disposed within a conventional groove will substantially reduce the friction and the ill effect thereof which normally occur in such a seal.

Another object is to provide an improved rotary seal of novel cross sectional configuration which will function in an improved manner and which can be manufactured at a minimum of expense.

These and other objects and advantages of this invention will more fully appear from the following description, made in connection with the accompanying drawings, wherein like reference characters refer to the same or similar parts throughout the several views, and in which:

FIG. 1 is a plan view of a groove formed in a surface and having one of my novel rotary seals disposed therewithin;

FIG. 2 is a plan view of the same groove with the rotary seal removed;

FIG. 3 is a view partly in elevation and partly in section showing one of my rotary seals installed to perfect a seal between a rotary cover which is shown in elevation and a pressure chamber which is shown in section;

FIG. 4 shows another typical installation utilizing one of my rotary seals wherein a rotary shaft is shown in elevation with its rotary face and the housing and cover plate shown in section.

FIG. 5 shows a typical installation of a rotary shaft seal utilizing one of my novel sealing rings, the shaft being shown in elevation and the housing being shown in section;

FIG. 6 is a vertical sectional view of the sealing ring shown in FIG. 5 on an enlarged scale and with the shaft removed;

FIG. 7 shows a second typical installation of one of my sealing rings within a rotary piston, the piston being shown fragmentarily in elevation and the cylinder fragmentarily in section; and FIG. 8 is an elevational view of the sealing ring shown in FIG. 7 on an enlarged scale and with the piston removed.

It will be noted that in each of the installations shown in FIGS. 3–5 and FIG. 7 the seal is perfected between a pair of relatively rotating surfaces. In FIG. 3, there is shown a tubular pressure chamber 10 which has a groove 11 formed in one end thereof. A rotary cover 12 rotates relative to the pressure chamber 10 and one of my sealing rings 13 is disposed within the groove 11 under compression and bearing against the surface 14 of the rotary cover to perfect a seal therewith. This type of seal may be utilized regardless of whether the pressure is applied to the seal in the direction of the arrow indicated as 15 or in the direction of the arrow indicated as 16.

It will be noted that the sealing ring which is indicated generally by the numeral 17 is of generally triangular configuration with the sealing surface 18 at the apex of the triangular shape. It will also be noted that the ring 17 is of uniform axial dimensions at the surface 18 throughout and of uniform radial dimensions throughout at the portion which bears against the bottom of the groove and that the corners of the triangular shape are convexly shaped and constitute short, stubby lobes as at 19. The areas between the lobes 19 are each concavely shaped, as best shown in FIG. 3. The sealing surface 18 of the sealing ring 17 is serpentine in configuration, as best shown in FIG. 1, so that as the rotary cover 12 rotates, the sealing surface 18 will wipe across a wider area than that of the sealing surface itself. In other words, any given segment of the sealing surface 18 will alternately wipe over areas of the rotary cover which vary in radial distance from the center of the cover or axis of rotation. Thus the sealing surface is narrower than the area across which the sealing action takes place.

The dotted lines in each of FIGS. 3 and 4 shows what any radial segment of the rotating face experiences during rotation, in respect to the sealing face of the ring 17.

It will be understood that in each of FIGS. 3 and 4, the axial space between the bottom of the groove and the face of the rotary cover 12 is less than the axial dimension of the unconfined sealing ring 17, thus maintaining a constant compressive force on the seal. The sealing base, as shown in FIGS. 3 and 4, is equal to the width of the groove. Whether pressure indicated by the arrow 15 is greater or lesser than the pressure indicated by the arrow 16, the sealing action is the same, making it usable for both pressure and vacuum devices.

The typical installation illustrated in FIG. 4 represents only one of almost infinitely variable combinations of sealing and rotating elements such as are commonly used in pumps and motors. The cover plate 20 is so dimensioned that the axial grooved space is always less than the axial dimension of the unconfined seal 21. The rotary face 22 can be a part of an attachment to the shaft 23. The static seal 24 can be of the face type or of an annular type and the bearing 25 can be of any standard type. Whether the greater pressure is outside of the housing 26 or inside the housing, the general performance of the seal is the same.

FIG. 5 illustrates a typical installation utilizing my seal in conjunction with a shaft 27 which rotates about its longitudinal axis within a housing 28, the latter having a groove 29 formed therein which faces toward the shaft 27. It will be noted that the exterior surface of the shaft 27 is in close contiguous and opposed relation with the inner surface of the bore of the housing 28 and that the seal 30 bears against the exterior surface of the rotating shaft. The seal 30 has greater radial dimensions than the radial depth of the groove 29 so that it is at all times maintained under compression to perfect a seal between the housing 28 and the shaft 27 while the latter rotates and the radial dimensions at the sealing surface 31 are uniform. Here again, as best shown in FIG. 6, the sealing surface 31 of the seal 30 is serpentine in configuration so that any given segment of the sealing area on the shaft 27 is alternately exposed and wiped by the sealing surface 31 as the shaft 27 rotates. The dotted lines in FIG. 5 show what any radial segment of the shaft experiences during rotation in respect to the sealing surface. It will be readily appreciated, of course, that the groove may be made within the rotary shaft 27 with the sealing surface 31 of the generally triangular shape of the seal 30 bearing against the opposed surface of the bore of the housing 28. In either of these situations, the sealing surface 31 will wipe across a sealing area which is of greater axial dimensions than the axial dimensions of the sealing surface 31 whereby portions of the sealing area will be alternately exposed and permitted to cool by convection or conduction. Here again the dimensions of the portions of the ring which bear against the bottom of the groove are uniform (measured axially of the groove and in this case, axially of the ring itself).

FIG. 7 illustrates a second typical installation wherein the groove 32 is formed in the exterior surface of a reciprocating piston 33 which also rotates about its longitudinal axis within a cylinder 34. It will be noted that the seal 35 again is of generally triangular configuration with the corners thereof rounded into short stubby lobes 36 and with the sealing surface 37 at the apex of the triangular configuration, the sealing surface bearing portion in this instance extending radially outwardly instead of radially inwardly as in FIG. 5. As best shown in FIG. 8, the sealing surface 37 is of serpentine configuration with the result that portions of the surface of the cylinder 34 against which the seal is perfected will be alternately wiped and exposed by the sealing surface 37 as the piston 33 rotates. It will be readily appreciated, of course, that the piston 33 could be utilized without longitudinal reciprocation and the same beneficial results would be obtained. Here again the radial dimension of the groove is always less than that of the free form of the seal 35 and pressure can be from either axial direction. The piston 33 can move either purely in rotation or in rotation plus reciprocal axial motion. The dotted lines in FIG. 7 as well as in FIG. 5 show what any radial segment of the shaft or cylinder experiences during rotation in respect to the sealing face 37.

In use, my seal substantially reduces the friction which normally results between two parts one of which rotates relative to the other because the area against which the seal is perfected is alternately exposed and wiped by the sealing surface, thereby permitting convection or conduction to cool that portion of the surface to substantially reduce the adverse effect which normally results from friction heat. In addition, wherever a fluid having a lower temperature than that of the seal face is being retained by the seal, the seal wipes some of this fluid across the seal face and thereby reduces the temperature thereof. Moreover, if the fluid has lubricating properties, this wiping action provides a lubricant to further substantially reduce the adverse effect of friction between the sealing surface and the face against which the latter bears.

It will, of course, be understood that various changes may be made in the form, details, arrangement and proportions of this invention which consists of the matter shown and described herein and set forth in the appended claims.

What is claimed is:

1. A ring-like sealing device comprising an annular member formed throughout of resilient flowable material and being adapted to perfect a seal between a pair of opposed contiguous surfaces one of which rotates relative to the other when said ring-like device is placed within a circular groove formed in one of the surfaces about the axis of rotation of the relatively rotating surface, said member in its free form having a relatively narrow annular sealing surface at one of its sides extending along its circumferential length and having a relatively broad sealing surface at its opposite side extending along its circumferential length, said relatively narrow annular sealing surface being serpentine in configuration whereby each segment of said annular relatively narrow sealing surface along its length will move back and forth over the surface against which it will bear and seal as the surfaces rotate relative to each other, the outer confines of said annular member considered axially being in the same plane at all points along its circumference, said relatively narrow annular sealing surface being disposed between the innermost and outermost surface of said annular member.

2. A rotary seal comprising, a pair of opposed contiguous relatively moving surfaces one of which rotates relative to the other, one of said surfaces having a circular groove formed therein about the axis of rotation of said relatively rotating surfaces, said groove facing the other of said surfaces, a one piece annular pressure sealing device formed throughout of resilient flowable material and disposed within said groove and having a sealing surface bearing against the surface opposite said groove and perfecting a seal therewith, said sealing device in its free form being of greater dimensions than the depth of the groove in its dimension which corresponds to the depth of the groove when disposed therewithin, said sealing surface of said device being disposed at one of its sides and extending along the circumferential length of said device and being serpentine in configuration in its free form whereby each segment of said sealing surface along its length will move back and forth over the surface against which it bears and seals as the one of said surfaces rotate relative to the other.

3. The structure defined in claim 2 wherein said sealing device in its free form is of generally triangular cross-sectional configuration and said sealing surface is at the apex of the triangular shape and the portion of its cross-sectional shape which constitutes the base of the triangle bears against the bottom of said groove.

4. The structure defined in claim 2 wherein said sealing device in its free form is of generally triangular cross-sectional configuration throughout and the portion of its cross-sectional shape which constitutes the base of the triangle bears against the bottom of the groove and is of uniform radial dimensions.

5. The structure defined in claim 2 wherein said sealing device in its free form is of generally triangular cross-sectional configuration and said sealing surface is at the apex of the triangular shape and the portion of its cross-sectional shape which constitutes the base of the triangle bears against the bottom of the groove and is of substantially equal axial dimensions therewith.

6. The structure defined in claim 2 wherein said sealing device in its free form is of generally triangular cross-sectional configuration and the areas of its outer surface between the corners thereof are each concavely shaped and its corners are convexly shaped short lobes.

7. The structure defined in claim 2 wherein said sealing device is of uniform radial dimensions throughout.

8. The structure defined in claim 2 wherein the portion of said device which bears against the bottom of the groove are uniform in axial dimensions throughout.

References Cited by the Examiner

UNITED STATES PATENTS

| | | | |
|---|---|---|---|
| 949,658 | 2/10 | Randall | 277—213 XR |
| 1,349,060 | 8/20 | Gall et al. | 277—81 |
| 2,081,040 | 5/37 | King | 309—52 |
| 2,369,008 | 2/45 | Beecher | 277—237 X |
| 2,473,284 | 6/49 | Knaggs | 277—207 X |
| 2,571,500 | 10/51 | Trevaskis | 277—96 |
| 2,647,770 | 8/53 | Tollefsbol | 277—207 |
| 2,873,132 | 2/59 | Tanner | 277—209 |
| 3,147,984 | 9/64 | Benoit | 277—211 |

LEWIS J. LENNY, *Primary Examiner.*

CORNELIUS D. ANGEL, SAMUEL ROTHBERG, WALTER A. SCHEEL, EDWARD V. BENHAM,
*Examiners.*